United States Patent
Smits et al.

(10) Patent No.: US 9,848,113 B2
(45) Date of Patent: Dec. 19, 2017

(54) MULTI-BAND BIOMETRIC CAMERA SYSTEM HAVING IRIS COLOR RECOGNITION

(71) Applicant: Samsung Electronicc Co., LTD., Gyeonggi-Do (KR)

(72) Inventors: Gerard Dirk Smits, Los Gatos, CA (US); Steven David Oliver, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 321 days.

(21) Appl. No.: 14/628,080

(22) Filed: Feb. 20, 2015

(65) Prior Publication Data
US 2015/0304535 A1    Oct. 22, 2015

Related U.S. Application Data

(60) Provisional application No. 61/943,104, filed on Feb. 21, 2014.

(51) Int. Cl.
*H04N 5/225* (2006.01)
*G06T 7/33* (2017.01)
(Continued)

(52) U.S. Cl.
CPC ....... *H04N 5/2258* (2013.01); *G06K 9/00604* (2013.01); *G06K 9/00617* (2013.01);
(Continued)

(58) Field of Classification Search
CPC ............... G06K 9/4652; G06K 9/2018; G06K 9/00281; G06K 9/00604; G06K 9/00617;
(Continued)

(56) References Cited

U.S. PATENT DOCUMENTS

| | | | | |
|---|---|---|---|---|
| 6,331,911 B1* | 12/2001 | Manassen | ............... | B82Y 20/00 257/14 |
| 6,753,919 B1* | 6/2004 | Daugman | .......... | G06K 9/00597 348/345 |

(Continued)

FOREIGN PATENT DOCUMENTS

FR    2910150    4/2009

OTHER PUBLICATIONS

Wilson, A., Depth-Sensing Video Cameras for 3D Tangible Tabletop Interaction, in proceedings of Second Annual IEEE International Workshop on Horizontal Interactive Humman-Computer Systems, 2007, Microsoft Research, Redmond, WA.

*Primary Examiner* — Jay Patel
*Assistant Examiner* — Marnie Matt

(57) ABSTRACT

A system and method for authenticating a user of a device. A multi-band biometric iris scan camera system is capable of obtaining an iris image using near-infrared (NIR) light and/or visible wavelength (VW) light. The camera system can initially image a user to detect the iris color of the user and, based on the iris color, determine whether to use the NIR iris scan or the VW iris scan. Additionally, NIR and VW systems can be operated as integrated camera systems. The iris scan camera system can take a series of images and compare against a database of anonymous iris images captured at different illumination conditions, for selecting a preferred illumination condition for capturing the iris and performing authentication. The iris scan camera system can optionally track eye movement to determine when to trigger an iris scan, identify obstructions to the iris such as eyelids and eyelashes to implement corrective measures in the iris image processing, and identify facial features to determine whether the left and/or right eye is being imaged.

20 Claims, 5 Drawing Sheets

(51) Int. Cl.
*G06T 7/90* (2017.01)
*G06K 9/00* (2006.01)
*G06K 9/20* (2006.01)
*G06K 9/22* (2006.01)
*H04N 5/33* (2006.01)
*G06K 9/46* (2006.01)

(52) U.S. Cl.
CPC .......... *G06K 9/209* (2013.01); *G06K 9/2027* (2013.01); *G06K 9/228* (2013.01); *G06T 7/337* (2017.01); *G06T 7/90* (2017.01); *H04N 5/332* (2013.01); *G06K 9/00281* (2013.01); *G06K 9/2018* (2013.01); *G06K 9/4652* (2013.01); *G06T 2207/10004* (2013.01); *G06T 2207/10016* (2013.01); *G06T 2207/10024* (2013.01); *G06T 2207/10152* (2013.01); *G06T 2207/30201* (2013.01)

(58) Field of Classification Search
CPC .......... G06K 9/2027; G06T 2207/1004; G06T 2207/10024; G06T 2207/10152; G06T 7/337; G06T 7/90; H04N 5/2258; H04N 5/332
USPC .......................................................... 348/78
See application file for complete search history.

(56) References Cited

U.S. PATENT DOCUMENTS

| | | | |
|---|---|---|---|
| 2006/0097172 A1* | 5/2006 | Park | G01J 3/36 250/338.1 |
| 2008/0219515 A1 | 9/2008 | Namgoong | |
| 2009/0225277 A1 | 9/2009 | Gil | |
| 2009/0245594 A1* | 10/2009 | Abramovich | G06K 9/2018 382/117 |
| 2009/0279790 A1* | 11/2009 | Burge | G06K 9/00604 382/209 |
| 2012/0163783 A1* | 6/2012 | Braithwaite | G06K 9/00255 396/18 |
| 2013/0250085 A1* | 9/2013 | MacKinnon | A61B 3/1216 348/78 |
| 2013/0293457 A1* | 11/2013 | Yoon | G06F 3/011 345/156 |
| 2013/0329053 A1* | 12/2013 | Jones | H04N 9/735 348/164 |

\* cited by examiner

MULTI-BAND BIOMETRIC CAMERA SYSTEM HAVING IRIS COLOR RECOGNITION

CROSS-REFERENCE TO RELATED APPLICATIONS

This application claims priority from U.S. Provisional Patent Application Ser. No. 61/943,104, filed Feb. 21, 2014, entitled "Biometric Iris Scan Method and Apparatus," the entire content of which is incorporated herein by reference.

FIELD OF THE INVENTION

Embodiments of the present disclosure generally relate to identifying a user of a device. More specifically, embodiments of the present disclosure relate to authenticating a user of a host device via iris identification.

BACKGROUND

Many electronic devices, such as smart phones and tablets, integrate biometric devices for the purpose of user authentication. The biometric devices can include, for example, iris scanners and camera systems capable of supporting iris identification functions, as well as additional functions such as facial recognition and gesture or motion recognition. However, iris scan systems have a number of limitations, especially those related to user variability, for example variability in iris color for several users of the device. Iris color is a result of differential absorption of light incident on pigmented cells in the outermost layer of the iris. A lesser amount of pigmentation results in less absorption and more light being reflected from the inner layers of the iris. Scattering during transmission of reflected light through the outer layer dictates perceived iris color, for example, a blue iris appearance. Higher levels of pigmentation lead to progressively darker iris coloring, with a dark brown iris appearance occurring at the upper end of high pigmentation levels.

An iris scan system optimized for one type of iris (e.g., iris color) can have limited functionality for a different type of iris, for example, optimization for a blue iris can limit capability for recognition of a brown iris. This can result in the iris scan system failing to correctly identify a user of the device.

Presently there are many variations of iris scan camera systems that function to capture images of the iris. Biometric iris scan camera systems that can be implemented on a mobile device face a number of challenges for effective operation. Several of these challenges include: iris variability (e.g. a user can have an iris color that is brown, blue, green, or another color); iris obstructions (e.g. eyelids, eyelashes, and other inherent features of the user can interfere with obtaining an image of the iris); ambient illumination (e.g. operation in full sunlight or in the presence of a strong optical noise source); motion blur (e.g. caused by eye saccades or other motions either controlled or involuntary); depth of field at close distances (e.g. images obtained at less than the camera systems intended focal length); additional cost and additional space for a biometric iris scan system, and; limited field of view. For reliable identification the camera must capture an image with resolution compatible with, for example, an approximately 200-row by 200-column line scan of the iris. The iris is typically only 10-12 mm in diameter, while the distance between the camera and the iris is considerable, typically approximately 40-50 cm; therefore, the camera capture area must be properly positioned on the face and iris area. A biometric iris scan camera system that is capable of addressing these issues would be advantageous.

SUMMARY

According to embodiments of the present disclosure, a host device includes a biometric iris scan camera system for reliable iris identification and user authentication. The iris scan camera system is capable of obtaining an iris image using near-infrared (NIR) light and/or visible wavelength (VW) light. The camera system can initially image a user to detect the iris color of the user and, based on the iris color, determine whether to use the NIR iris scan or the VW iris scan. Additionally, NIR and VW systems can be operated as integrated camera systems. The iris scan camera system can take a series of images and compare against a database of anonymous iris images captured at different illumination conditions, for selecting a preferred illumination condition for capturing the iris and performing authentication. The iris scan camera system can optionally track eye movement to determine when to trigger an iris scan, identify obstructions to the iris such as eyelids and eyelashes to implement corrective measures in the iris image processing, and identify facial features to determine whether the left and/or right eye is being imaged.

According to an aspect of the present disclosure, a biometric iris scan camera system for a host device includes a first illumination source disposed on a host device and configured to illuminate a person at a near infrared (NIR) wavelength during an image capture. The host device includes a second illumination source disposed on the host device and configured to illuminate the person at a visible wavelength (VW), and a biometric camera disposed on the host device. The biometric camera includes a first imaging sensor configured to convert an NIR image of the person into an electronic signal for generating a first video image of the person, a second imaging sensor configured to convert a VW image of the person into an electronic signal for generating a second video image of the person, and a processor configured to select, based on an iris color of the user, one of the first illumination source and the second illumination source to illuminate the person during the image capture, to receive a corresponding video image of the person, and to determine an authentication status of the person based on the video image.

According to another aspect of the present disclosure, a method of capturing an image of a person for biometric identification includes selecting an illumination wavelength based on an iris color of a person. The method includes illuminating the person with a light source at the selected wavelength during an image capture, the light source adjacent to a camera system comprising a first image sensor responsive to a near infrared (NIR) wavelength and a second image sensor responsive to a visible wavelength (VW), the camera system and the light source housed in a host device. The method includes receiving reflected illumination of the person at the selected wavelength during the image capture, at the image sensor corresponding to the selected wavelength. The method includes generating an electrical signal corresponding to the reflected illumination of the person, processing the electrical signal to generate an image of the iris of the person, and determining an authentication status of the person based on the iris image.

According to another aspect of the present disclosure, a mobile apparatus operable for biometric user authentication includes a processor, a memory storing an iris database and operatively coupled to the processor, an illumination source configured to emit illumination at a controlled wavelength, the illumination operable for illuminating an iris of a subject, and a camera. The camera includes a first imaging sensor configured to convert a near-infrared (NIR) image of the subject into an electronic signal for generating a first video image of the iris, and a second imaging sensor configured to convert a visible wavelength (VW) image of the person into an electronic signal for generating a second video image of the iris. The processor is configured to select the controlled wavelength for an image capture based on an iris color, and to receive and match video images of the iris with a previously registered image stored in the iris database, wherein the subject is authenticated if a match is determined.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
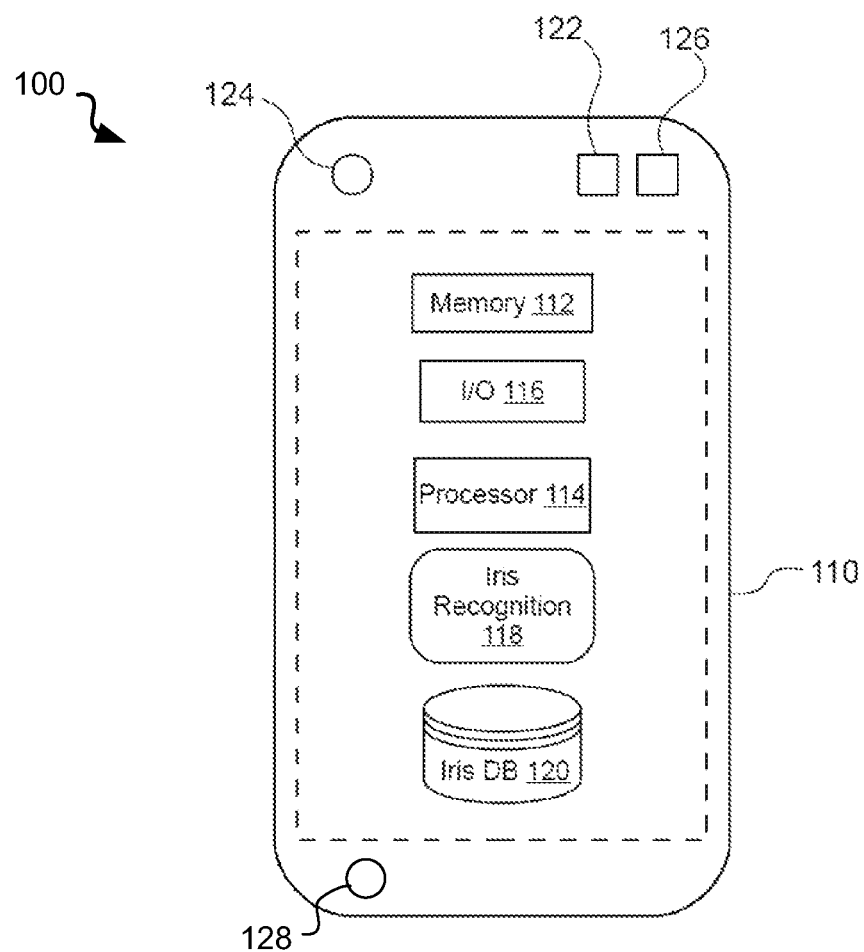
FIG. 1 is a block diagram illustrating a biometric iris scan camera system on a host device, according to an embodiment of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which can be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments can be practiced without these specific details or with equivalents thereof. In other instances, well-known methods, procedures, components, and circuits have not been described in detail as not to unnecessarily obscure aspects and features of the subject matter.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module can advantageously be configured to reside in the addressable storage medium and configured to execute on one or more processors. Thus, a component or module can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules can be combined into fewer components and components or modules or further separated into additional components and components or modules.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, a block diagram is depicted illustrating an exemplary embodiment of a biometric iris scan camera system on a host device 100. The device 100 has components including a memory 112, at least one processor 114, input output devices (I/O) 116. According to an exemplary embodiment, the host device 100 is provided with a biometric iris scan camera system. The biometric iris scan camera system can be used, for example, to capture images of the human iris for user identification and authentication. In one embodiment, the biometric iris scan camera system can include a visible wavelength (VW) imaging sensor 122, and near infrared (NIR) imaging sensor 126, a NIR light source 124, and a VW light source 128. The VW imaging sensor 122 is sensitive to illumination in the visible spectrum, while the NIR imaging sensor 126 is sensitive to illumination in the near infrared spectrum. The biometric iris scan camera system includes an iris recognition component 118 and an iris database 120. In one embodiment, the iris recognition component 118 and the iris database 120 are software components stored in the memory 112 and executed by the processor 114.

The biometric iris scan camera system can be used to capture images of a user's iris for user identification and authentication. The use of the NIR light source 124 and imaging sensor 126 is preferred for imaging a user iris of a darker color (e.g., a brown iris), while use of the VW light source 128 and imaging sensor 122 is preferred for imaging a user iris of a lighter color (e.g., a blue iris). According to an embodiment, in operation the NIR light source 124 illuminates (e.g., flashes) a user of the device with near infrared light during image capture, and an imaging sensor sensitive to NIR wavelengths (e.g., NIR imaging sensor 126) converts an optical image of an object into an electronic signal for image processing. According to embodiments of the present disclosure, the biometric camera system can also include a visible wavelength (VW) light source 128 that illuminates a user of the device with visible light during image capture, and an imaging sensor sensitive to visible wavelengths (e.g., VW imaging sensor 122) that converts an optical image of an object into an electronic signal for image processing. Video images output from the imaging sensor (e.g., NIR imaging sensor 126, VW imaging sensor 122, or a combination thereof) are received by the iris recognition component 118, which determines an authentication status of the user. For example, the authentication status of the user is determined via attempts to match the image of the iris with previously registered images stored in the iris database 120. If a match is found, then the user is able to be authenticated.

The memory 112, the processor 114, the I/O 116, the VW imaging sensor 122, the NIR imaging sensor 126, and the display 110 can be coupled together via one or more system buses (not shown). The memory 112 can comprise one or more memories comprising different memory types, including RAM, ROM, cache, virtual memory and flash memory, for example. The processor 114 can include a single processor having one or more cores, or multiple processors having one or more cores. The I/O 116 is a collection of components that input information and output information. Example components comprising the I/O 116 can include a microphone, speaker, and a wireless network interface controller (or similar component) for communication over the network. The processor 114 can execute an operating system (OS) that manages hardware resources and performs basic tasks. Examples of the OS can include Symbian™, BlackBerry OS™, iOS™, Windows™, and Android™. In one embodiment, the display 110 can be integrated with the host device 100, while in another embodiment the display 110 can be external to the host device 100.

In one embodiment, the host device 100 can comprise any type of mobile device form factor, including but not limited to: a cell- or smart-phone; a tablet; a notebook or laptop computer; a television; and a wearable computer, for example. In one embodiment, the host device 100 can be implemented with the display 110, the VW imaging sensor 122, and NIR imaging sensor 126 located on the same side of the host device 100, such that the VW imaging sensor 122 and NIR imaging sensor 126 are pointed at a user as the user holds the device to view the display 110. In the embodiment where the host device 100 comprises a laptop or notebook, the VW imaging sensor 122 and NIR imaging sensor 126 are typically housed within a lid of the laptop.

As shown in FIG. 1, in an embodiment the VW imaging sensor 122 and NIR imaging sensor 126 are located in one corner of the host device 100 (although other locations are possible), while the NIR light source 124 and VW light source 128 can be located in opposite corners, to offset the NIR light source 124 and VW light source 128 from the VW imaging sensor 122 and NIR imaging sensor 126 within the body of the host device 100. The biometric iris scan camera is configured to capture iris images at distances typically of around 40-50 cm. The resolution of the captured iris image is configured to be high enough to support an adequate number of points scanned upon the iris image to identify a user, typically such a resolution corresponding to a 200-row by 200-column line scan. Focal length and field of view of the camera system are adjusted accordingly so that sufficient resolution is achieved.

In an embodiment of the present disclosure, the NIR light source 124 can be implemented using micro light emitting diodes (LEDs), a laser diode, or another light source with emission in the infrared band (i.e. 700-900 nm wavelength). The emission can be either narrow- or broad band within this infrared spectrum. According to an embodiment, the NIR light source 124 can be focused and directed to point into a user's eye located at an expected distance when the host device 100 is held normally by the user.

In some embodiments, the VW light source 128 can be one of a white light LED, a blue light LED, or an LED of a different color in the visible band. The VW light source 128 can be focused and directed to point into the user's eye located at an expected distance when the host device 100 is held normally by the user. According to an embodiment, the VW light source 128 is optional, and sunlight and/or other ambient light sources can be used in place of the VW light source 128. According to an embodiment, detected obstructions (such as eyelashes) that interfere substantially with iris image acquisition can trigger use of VW light source 128 (e.g., an LED) instead of an ambient light source (such as sunlight). In another embodiment the VW image sensor 122 used for VW iris scanning can be a standard red-green-blue (RGB) image sensor used for conventional image acquisition, such as those found on host devices including smart phones, tablets, and laptop computers. For example, the VW image sensor 122 can be a front facing camera such as one typically found on a mobile device for video chatting purposes.

In one embodiment, the VW imaging sensor 122 and NIR imaging sensor 126 can include a built-in rolling shutter or a freeze-frame shutter. In one embodiment, the VW imaging sensor 122 and NIR imaging sensor 126 can comprise a digital charge-coupled device (CCD) or complementary metal-oxide-semiconductor (CMOS) active pixel sensor (APS), and can possess a pixel size and pitch adequate to capture sufficient points in the iris image for authentication purposes. The required pixel size and pitch are a function of the field of view, focal length, and other optical considerations. In one embodiment, the NIR light source 124 emits light at a power level below 1 mW and near a wavelength of 850 nm. In another embodiment the NIR light source 124 emits light at a power level substantially above 1 mW, possibly up to several tens or hundreds of mW or more. Different combinations of energy and time can be selected in order to optimize different imaging scenarios as desired, with variable NIR light source 124 power levels.

In one embodiment, the VW light source 128 emits light at a power level up to 10 mW and at a wavelength within the range 390-700 nm. In another embodiment the VW light source 128 emits light at a power level substantially above 10 mW, up to several hundred mW or more. Different combinations of energy and time can be selected in order to optimize different imaging scenarios as desired, with variable VW light source 128 power levels. As an example, for a VW light source 128 configured to output 10-100 mJ of energy with a short pulse duration, such as 1-10 μs, the power level can reach 1000-100,000 W.

Iris Recognition

Recognition of the iris via iris recognition 118 includes distinguishing the iris from the sclera and the pupil. This can be accomplished, for example, by identifying high contrast edges of an iris image to be the boundary between these portions of the eye. Taking the derivative of the image intensity and identifying local extrema of the derivative's magnitude can determine the transitions from sclera to iris, and from iris to pupil. Obstructions, such as eyelids and eyelashes, can be excluded using approaches such as feature recognition and geometric modeling for identification of the obstructions. Pattern matching of a captured iris image for purposes of identification and authentication involves: aligning the captured iris image with an iris image from a database iris image entry (e.g., iris database 120); choosing an appropriate representation of the iris image so the distinctive aspects of the iris pattern are apparent; evaluating the quality of match between the captured iris image and the database entry; and, making a determination as to whether or not the captured iris image matches a database entry.

Figure 2:
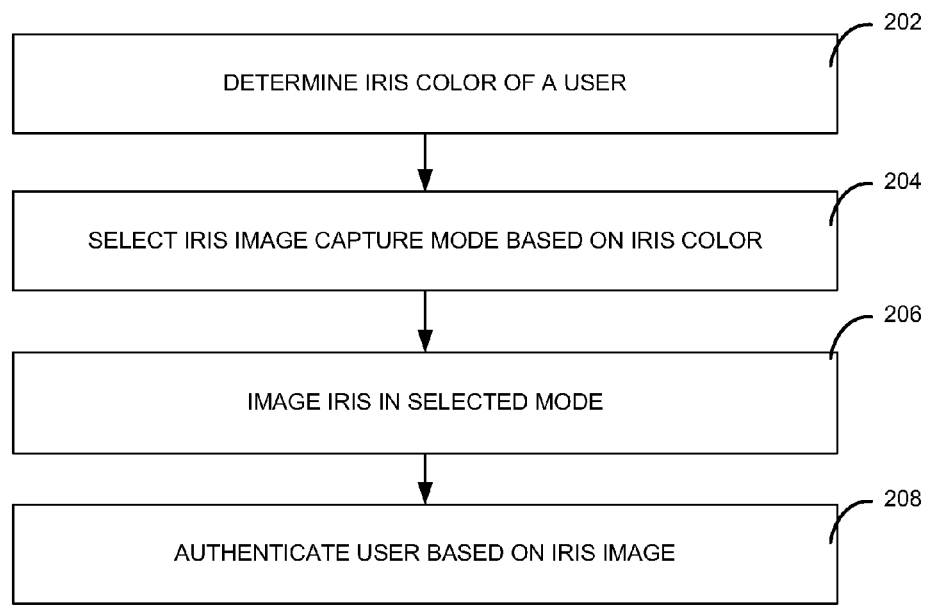
FIG. 2 is a flow chart illustrating a method of operation of a biometric iris scan camera system on a host device, according to an exemplary embodiment of the present disclosure.

Referring now to FIG. 2, a process 200 is depicted for iris image processing for purposes of user identification and authentication. The flow chart 200 can be implemented as computer-executable instructions residing on some form of non-transitory computer-readable storage medium.

At step 202 a determination is made of the iris color of a user, via an image of the user. According to an embodiment the image of the user is taken in real-time, that is, just prior to the determination of the iris color. For purposes of user identification and authentication there are generally four classes of iris colors: dark brown; light brown; blue; and, blue-green. The Illumination light source wavelength for preferred imaging of each of these iris color types is different. Illumination centered about the NIR wavelengths is generally preferred for dark brown irises, while illumination centered about the NIR-red wavelengths is generally preferred for light brown irises. Illumination centered about blue wavelengths is generally preferred for blue and blue-green irises.

At step 204 an iris image capture mode is selected, based upon the iris color determined at step 202. According to an embodiment, the capture mode determines the components of the biometric iris scan camera system that are used for determining an authentication status of the user. For example, the use of the NIR light source 124 and imaging sensor 126 is preferred for imaging a user iris of a darker color (e.g., a brown iris), while use of the VW light source 128 and imaging sensor 122 is preferred for imaging a user iris of a lighter color (e.g., a blue iris). According to embodiments of the present disclosure, the capture mode is exclusive, and either components of the NIR spectrum (e.g., employing NIR light source 124 and imaging sensor 126) or the VW spectrum (e.g., employing VW light source 128 and imaging sensor 122) are activated. According to some embodiments, the capture mode can include activation of both the VW imaging sensor 122 and the NIR imaging sensor 126, as well as the NIR light source 124. According to some embodiments, activation of the VW light source 128 is optional.

At step 206 the user is imaged according to the capture mode selected at step 204. Image capture includes activation of the illumination source corresponding to the capture mode (e.g., NIR or VW), generation of an image by an imaging sensor responsive to the illumination wavelength, and processing of the image by a camera system processor (e.g., processor 114).

At step 208 the user is authenticated, based on the image of the iris acquired at step 206. For example, the authentication status of the user is determined via attempts to match the image of the iris with previously registered images stored in the iris database 120. If a match is found, then the user is able to be authenticated. The iris image may be pre-processed, for example via isolation of relevant portions of the iris image from the complete image, noise reduction, etc. Further, iris image processing can include a filter application for texture or feature extraction, and quantization of extracted iris image features into a binary vector. The match determination to iris database 120 can be based on a comparison to database iris image feature vectors of iris images in iris database 120.

In one embodiment, processing of the iris image for purposes of iris recognition and authentication at step 208 includes the use of a Gabor filter to extract the features of the iris. The Gabor filter is a form of Fourier transform which functions as a bandpass filter that is readily applicable for edge or feature detection for an image. The response of the Gabor filter is from the multiplication of a Gaussian envelope function (e.g., a window function providing greater weight for a portion of a signal near, for example, a particular time region) with a complex oscillation function (e.g., a complex sinusoid). The Gabor filter applied to an iris image can be defined in various coordinate systems including, for example, a Cartesian coordinate system or a polar coordinate system. The Gabor filter is orientation-sensitive in multiple dimensions. According to embodiments of the present disclosure, the user iris image can further be processed with a set of Gabor filters with different parameter values, such as different bandwidths and different modulation frequencies. Other filtering and feature extraction techniques are consistent with the spirit and scope of the present disclosure.

The iris feature vectors extracted from the user iris image, unique to each iris, are quantized for conversion to binary form. From binary form, the Hamming distance can be used as a classifier for comparison between different binary iris feature vectors (e.g., between the user iris and irises of iris database 120). Other matching techniques are consistent with the spirit and scope of the present disclosure. Match determination based on comparison of the user iris image feature vector and an iris image feature vector from iris database 120 is able to be performed using the Hamming distance between two iris image feature vectors of equal string length. The Hamming distance functions as a classifier to compare iris features through statistical independence, where the number of corresponding string positions which are different between two iris feature vectors indicate the degree of dissimilarity (e.g., the number of string element substitutions required to generate a match can be minimized in order to determine the closest match).

Figure 3:
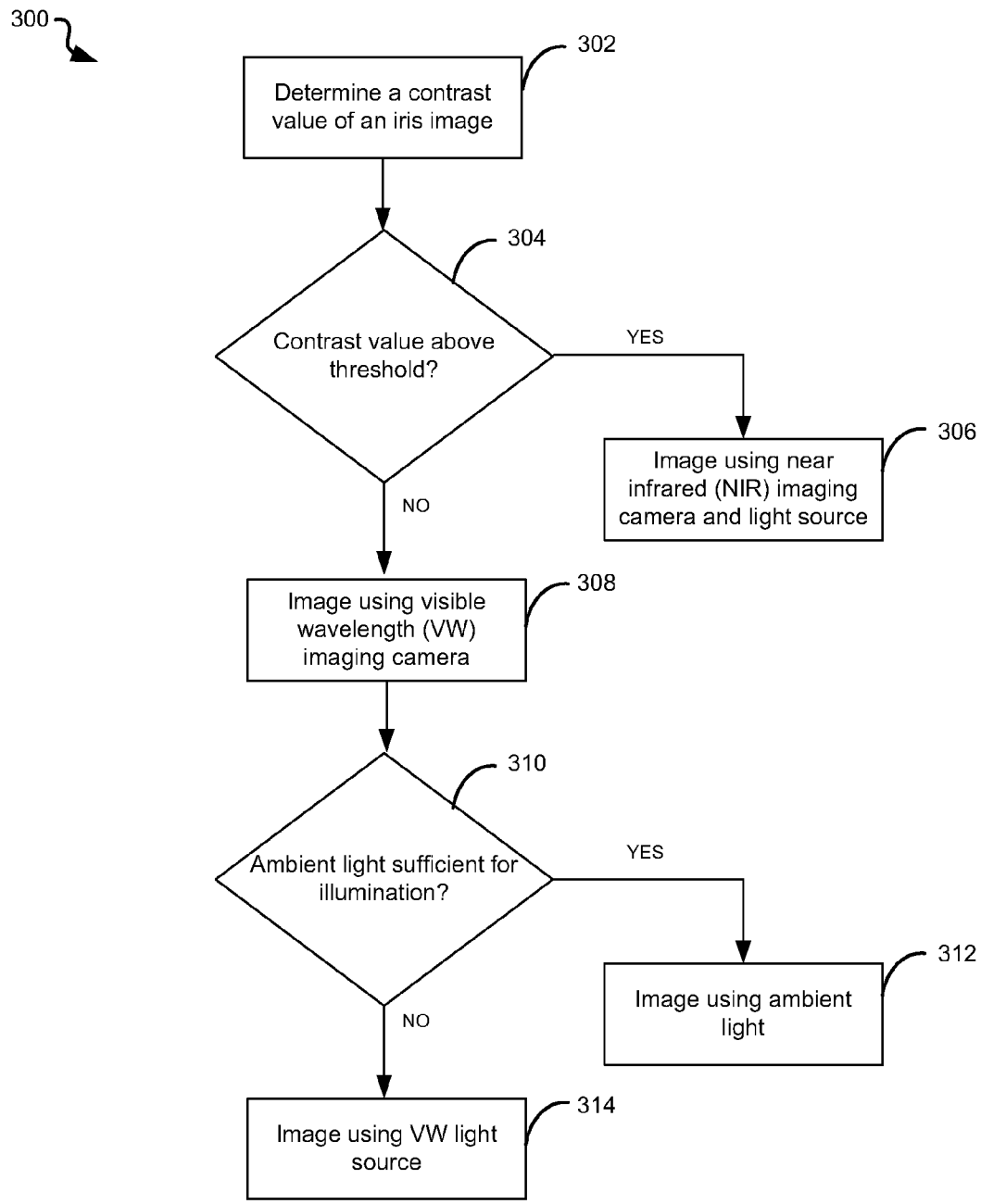
FIG. 3 is a flow chart illustrating a method of operating a biometric iris scan camera system to determine an imaging capture mode, according to an exemplary embodiment of the present disclosure.

Referring now to FIG. 3, a flow chart 300 illustrates a method of determining a band (e.g., illumination spectrum)

of light source and imaging sensor operation for a biometric iris scan camera system, according to embodiments of the present disclosure. In general, iris colors of a darker color have a higher contrast value, and are preferably imaged at NIR, while iris colors of a lighter color have a lower contrast value and are preferably imaged at visible wavelengths. The flow chart 300 can be implemented as computer-executable instructions residing on some form of non-transitory computer-readable storage medium.

At step 302 a determination is made of a contrast value of an iris image. According to an embodiment the iris image of a user is taken in real-time, that is, just prior to the determination of the iris contrast. The contrast value can be computed by a processor of a host device, for example, processor 114 of host device 100.

At step 304 the contrast value determined at step 302 is compared against a threshold contrast level. According to embodiments of the present disclosure, the threshold contrast level corresponds to an iris color where a transition in image sensor responsiveness occurs. More specifically, the transition can be a transition in responsiveness from NIR wavelengths to VW, such that iris colors of greater contrast levels are imaged with greater responsiveness by an imaging sensor sensitive to NIR wavelengths, and iris colors of contrast levels below the threshold are imaged with greater responsiveness by an imaging sensor sensitive to VW. At step 304 if the contrast value is determined to be above the threshold, the method proceeds to step 306. Step 306 corresponds to image captures performed at NIR wavelengths, where a NIR illumination source (e.g., NIR illumination source 124) is used in concert with an imaging sensor responsive to NIR (e.g., imaging sensor 126).

If at step 304 it is determined that the iris contrast is not above the threshold level, the method proceeds to step 308. Step 308 corresponds to image captures performed at visible wavelengths, where visible illumination is used in concert with an imaging sensor responsive to visible wavelengths (e.g., imaging sensor 122). According to embodiments of the present disclosure, the level of ambient illumination is determined to see if it is of sufficient illumination for imaging of the iris at visible wavelengths.

At step 310 a determination is made of whether ambient light levels are sufficient for imaging at visible wavelengths. If YES, the method proceeds to step 312, where ambient light is used in concert with a visible wavelengths imaging sensor to capture an image of the user iris.

If NO, ambient light is not sufficient for imaging and the method proceeds to step 314. Step 314 includes the use of a visible wavelength illumination source (e.g., VW illumination source 128) in concert with a visible wavelengths imaging sensor to capture an image of the user iris.

Illumination Conditions

Figure 4:
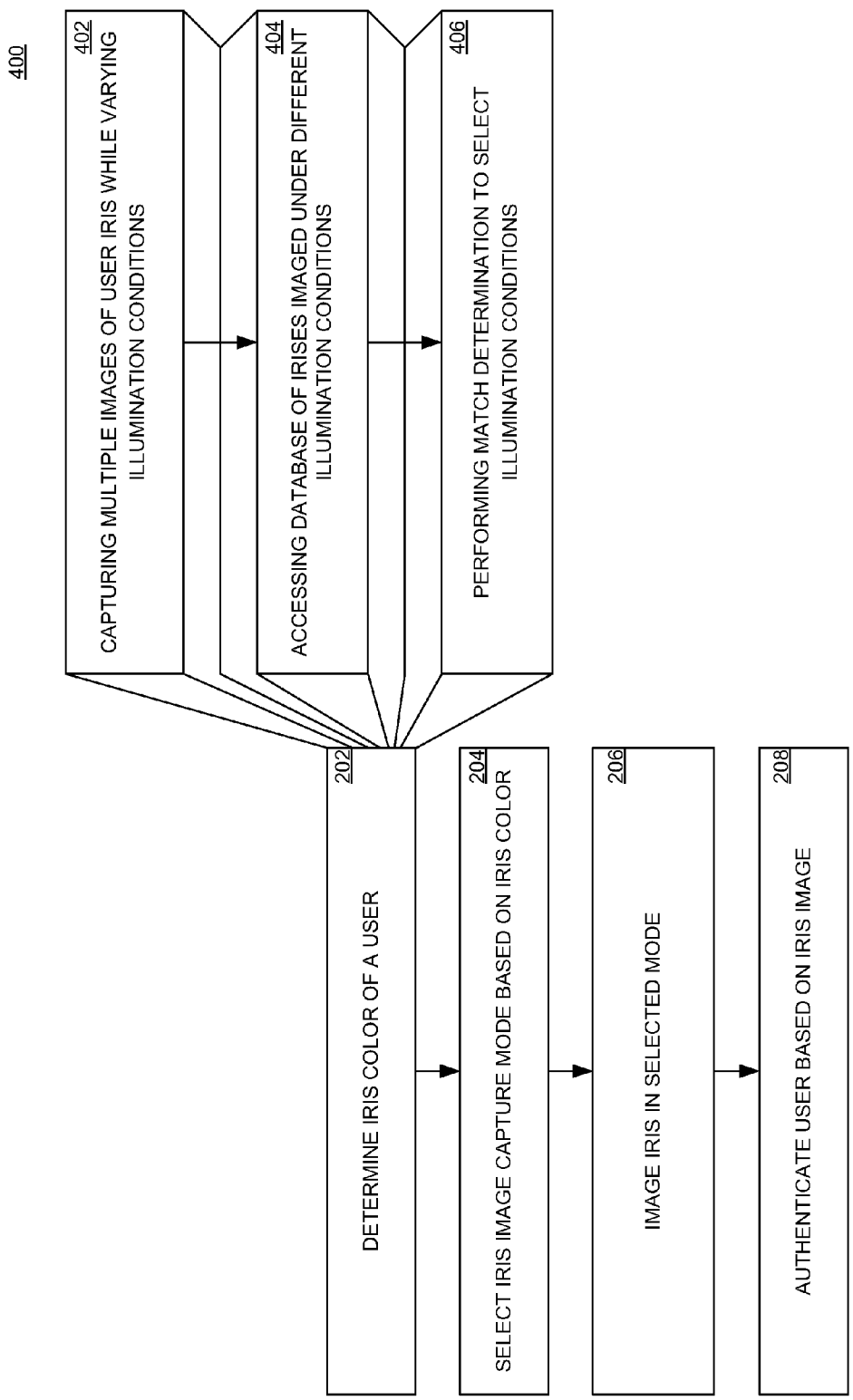
FIG. 4 is a flow chart illustrating a method for iris image acquisition and processing for purposes of user recognition and authentication, including calibration steps for optimization of illumination conditions and implementation in the context of an anonymity protocol, according to an exemplary embodiment of the present disclosure.

According to embodiments of the present disclosure, an optional step of process 200 described above includes a calibration step incorporating use of different lighting conditions prior to the image acquisition step 204. Referring now to FIG. 4, a flow chart 400 illustrates a method of iris image acquisition and processing for purposes of user recognition and authentication, including calibration steps for optimization of illumination conditions, and optional implementation in the context of an anonymity protocol. The flow chart 400 can be implemented as computer-executable instructions residing on some form of non-transitory computer-readable storage medium.

Step 402 of process 400 can be performed during step 202 of process 200, determination of an iris color of a user. At step 402 a series of iris images corresponding to a series of lighting conditions are captured. According to an embodiment the series of images are captured in real-time, that is, just prior to the authentication of the user.

At step 404 a database of anonymous irises that have been imaged under different illumination conditions is accessed. Iris images captured at an earlier time and provided as part of the iris image database can include a series of iris image datasets, each dataset corresponding to a different lighting condition. According to an embodiment, generation of such a database for use in iris-based user recognition and authentication (e.g., process 200) may be incorporated as a step ahead of those related to real-time iris image acquisition.

At step 406 a match determination is performed to select preferred illumination conditions for imaging an iris of a user for authentication. According to an embodiment, the database of iris images is used to provide models against which real-time iris images captured under different lighting conditions can be matched, in order to determine preferred illumination and image acquisition/processing conditions. For example, each entry in the database can represent a specific iris type (e.g., color), where the image of that iris type is captured using known, preferred conditions. That is, for a brown iris, the brown iris image in the iris database will have been captured using NIR wavelengths and NIR imaging sensor, at a given illumination source power, exposure time, and further imaging parameter values. By matching the real-time iris images taken under different lighting conditions to database models, the preferred illumination condition and parameter space used to perform recognition and authentication is able to be determined.

According to some embodiments of the present disclosure the illumination source is integral to the iris image camera system (e.g., illumination sources 124 and 128 of host device 100). However, according to some embodiments other light sources may be used including, for example, ambient light (such as sunlight). For illumination sources originating from the ambient environment, the parameter space of the preferred illumination conditions for the iris image database can take into consideration a different lighting condition for improved imaging results. Additional lighting conditions can include the various illumination sources described above (e.g., illumination sources 124 and 128 of host device 100), including the presence of environmental factors affecting the captured iris image. Environmental factors can include, but are not limited to, interference from ambient light, motion blur, image obstructions, and so forth.

Anonymity Protocol

In certain embodiments, the method 400 described above can be implemented within the context of an anonymity protocol, such that no record of traceability between iris data and individuals exists. A method of iris image processing for purposes of untraceable user identification and authentication comprises the steps of: generation of an anonymous iris database (e.g., using iris contrast as described herein); downloading the database model to a host device; acquiring a set of images of the user's iris under different lighting conditions; performing weighted optimization of uniqueness (e.g. based on the Hamming distance response to the database values); using the image from the set of images of the user's iris determined to be the most ideal in terms of illumination conditions and parameter space for recognition and authentication.

The anonymous iris database according to an exemplary embodiment includes around 10,000 iris images of different iris types (e.g., different iris colors) taken under different lighting and processing conditions and parameters. The iris images can include approximately equal numbers of images for each iris type (e.g., approximately 2500 images of brown irises, 2500 images of blue irises, etc.). According to embodiments of the present disclosure, each of the supplied iris images in the database contains no link to the person from which the iris image originates. According to an embodiment, the database can be stored locally on a host device so that utilization of the database during user recognition and authentication need not require transmission of any data beyond the host device (e.g. to a shared or externally controlled data center). According to an embodiment, the database is stored remotely, and can be accessed via a remote protocol (e.g., the Internet, WiFi, etc.). Real-time images of the user's iris may be retained locally for recognition and authentication, without transmission of any related data outside the host device.

Combined Near-Infrared and Visible Wavelength Functionality

While embodiments of the NIR and VW iris scan functions have been described as image captures of NIR and VW occurring in sequence, iris image capture using the NIR and VW camera systems simultaneously is also within the spirit and scope of the present invention. In one embodiment, the NIR and VW illumination sources (e.g., illumination sources 124 and 128, respectively) can emit light at the same time, and separate NIR and VW image sensors (e.g., imaging sensors 126 and 122, respectively) can be exposed at the same time. According to another embodiment, NIR and VW image sensors are integrated into a single NIR/VW image sensor. Once iris images are acquired by both the NIR and VW imaging sensors, the iris image deemed to be of higher quality for purposes of user identification and authentication can be used for authentication purposes, while the iris image determined to be of lower quality can be rejected. Higher quality may be determined using measures such as higher contrast or MTF of the iris images.

Ambient Light Rejection

Ambient light presents a difficulty for capturing an image of the user (e.g., an iris) with adequate detail to perform an image match with pre-registered images. Ambient light can saturate an imaging sensor and overwhelm the signal (that is, the reflected illumination from the user, such as the iris). One approach to minimizing ambient noise is to make the exposure time to be as short as practically possible.

In one embodiment, a solid-state shutter comprising gallium arsenide (GaAs) may be used with either the NIR or VW imaging sensor, or both. Such a shutter can change its state from opaque to transparent in a very short time (e.g. several nanoseconds) by an externally applied voltage. In an embodiment, a GaAs shutter is used to image an iris with light near a wavelength of 850 nm.

In an embodiment, when performing an iris scan in the visible light spectrum, light source flash duration is minimized (in a case where VW illumination source 128 is used), and thereby exposure time is reduced accordingly. In an embodiment, the flash duration of VW light source 128 is below 150 ms and the power is in the range of 10 mW, to compensate for the short exposure time. The instantaneous light source power can be made as high as practically possible while still preventing damage to the human eye or causing any user discomfort. Additional measures can be taken to avoid the light source causing user discomfort, for example the use of a diffuse light source. According to an embodiment, keeping a solid-state shutter (e.g., GaAs shutter) closed at all times except during image capture reduces the ambient light received from elsewhere in the scene significantly.

Figure 5:
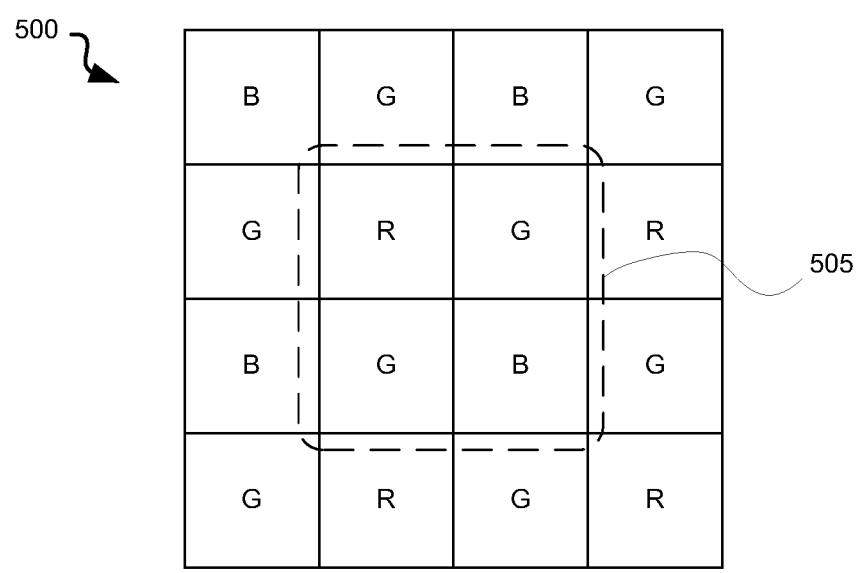
FIG. 5 is a schematic diagram illustrating a visible wavelength image sensor featuring narrow band pixels for use in a biometric iris scan camera system on a host device, according to exemplary embodiments of the present disclosure.

Adverse ambient light effects can also be reduced by the use an imaging sensor with narrow band pixels, where the bandwidth of the pixels is matched to the emission wavelengths of the light source. Referring now to FIG. 5, an imaging sensor 500 featuring narrow band pixels 505 for use in a biometric iris scan camera system is depicted. According to an embodiment, the imaging sensor 500 is a visible wavelength image sensor. According to an embodiment the image sensor 500 includes red, green, and blue pixels. As a non-limiting example, for a blue light LED used as the light source, pixel bandwidth for narrow band pixels 505 can be configured around a narrow range corresponding to blue light (e.g., for blue LED, range about 450-495 nm). Other light source wavelengths and narrow band pixels are consistent with the spirit and scope of the present disclosure. According to embodiments of the present disclosure, narrow band pixels 505 may be arranged in a Bayer pattern in a manner similar to conventional RGB pixel arrays. According to some embodiments, narrow band pixels 505 can make up only a subset of the pixels within a pixel array, and are integrated into the pixel array that also contains conventional bandwidth pixels. Narrow band pixels 505 can comprise one or more of red, green, and blue pixels, and combinations thereof.

In addition to rejection of ambient illumination, embodiments of the present disclosure include a host device configured for very short exposure time, reducing motion blur during image capture. According to some embodiments, the NIR and VW sensing functions can be integrated onto a single image sensor capable of detecting both VW and NIR light. Such an integrated image sensor can include various combinations of conventional bandwidth NIR pixels, conventional bandwidth VW pixels, and narrow band pixels centered about any desired wavelength corresponding to those used for iris scanning. These pixels can be arranged in various patterns, including those featuring a Bayer pattern.

A method and system for a biometric iris scan camera system has been disclosed. The present invention has been described in accordance with the embodiments shown, and there could be variations to the embodiments, and any variations would be within the spirit and scope of the present invention. Aspects of the present disclosure can be embodied in a computer-readable media including program instructions to implement various operations embodied by a computer or computing device (e.g., a cellular phone, tablet device, etc.). The media can also include, alone or in combination with the program instructions, data files, data structures, and the like. The media and program instructions can be those specially designed and constructed for the purposes of the example embodiments of the present disclosure, or they can be of the kind well-known and available to those having skill in the computer software arts. Examples of computer-readable media include magnetic media such as hard disks, floppy disks, and magnetic tape, optical media, for example, CD ROM disks and DVD, magneto-optical media, for example, optical disks, and hardware devices that can be specially configured to store and perform program instructions, for example, read-only memory (ROM), random access memory (RAM), flash memory, and the like. Aspects of the present disclosure can also be realized as a data signal embodied in a carrier wave and comprising a program readable by a computer and transmittable over the Internet. Examples of program instructions include both machine code, for example, produced by a compiler, and files containing higher level code that can be executed by the computer using an interpreter. The described hardware devices can be configured to act as one or more software modules in order to perform the operations of the above-described example embodiments of the present disclosure.

Embodiments of the present disclosure are thus described. While the present disclosure has been described in particular embodiments, it should be appreciated that the present disclosure should not be construed as limited by such embodiments, but rather construed according to the following claims. Accordingly, many modifications can be made by one of ordinary skill in the art without departing from the spirit and scope of the appended claims.

What is claimed is:

1. A biometric iris scan camera system for a host device, comprising:
   a first illumination source disposed on the host device to illuminate a person with near infrared (NIR) light;
   a second illumination source disposed on the host device to illuminate a person with visible light; and
   a biometric camera disposed on the host device, the biometric camera comprising:
      a first imaging sensor to detect NIR light;
      a second imaging sensor to detect visible light; and
      a processor coupled to the first and second imaging sensors, the processor to:
         generate an initialization image of an iris from an initialization signal output by one of the first imaging sensor and the second imaging sensor;
         determine a contrast of the initialization image;
         activate the second illumination source to illuminate the iris with a visible wavelength during an authenticate capture time when the contrast of the initialization image falls below a value;
         activate the second imaging sensor to detect visible light reflected from the iris during the authenticate capture time when the second illumination source is activated, the second imaging sensor to generate a visible signal in response to detected visible light reflected from the iris during the authenticate capture time;
         generate a visible image from the visible signal; and
         determine an authentication status based on the visible image.

2. The system according to claim 1, wherein the processor:
   activates the first illumination source to illuminate the iris with NIR light during the authenticate capture time when the contrast of the initialization signal lies above the value;
   activates the first imaging sensor to detect NIR light during the authenticate capture time when the first illumination source is activated, the first imaging sensor to generate a NIR signal in response to NIR light reflected from the iris during the authenticate capture time;
   generate a NIR image from the NIR signal; and
   determine an authentication status based on the NIR image.

3. The system according to claim 2, wherein the value is a threshold contrast level.

4. The system according to claim 1, wherein the first and the second illumination sources illuminate the iris with both NIR light and visible light at a same time during an initial capture time.

5. The system according to claim 4, wherein the initialization image is an initial NIR image, the initialization signal is an initial NIR signal output by the first imaging sensor in response to NIR light reflected from the iris and detected during the initial capture time, and the contrast of the initialization image is the contrast of the initial NIR image.

6. The system according to claim 5, and further comprising:
   generating an initial visible image from an initial visible signal output by the second imaging sensor in response to visible light reflected from the iris and detected during the initial capture time; and
   determining a contrast of the initial visible image.

7. The system according to claim 6, wherein the value is the contrast of the initial visible image.

8. A method of capturing an image of a person for biometric identification, the method comprising:
   generating an initialization image of an iris from an initialization signal;
   determining a contrast of the initialization image;
   selecting a visible illumination wavelength when the contrast of the initialization image falls below a value;
   illuminating the iris with light at the visible illumination wavelength during an image capture;
   receiving visible illumination reflected from the iris at the visible illumination wavelength during the image capture;
   generating an electrical signal in response to the received visible illumination reflected from the iris at the visible illumination wavelength;
   processing the electrical signal to generate an iris image of the person; and
   determining an authentication status of the person based on the iris image.

9. The method according to claim 8 further comprising:
   illuminating the iris with NIR light during the authenticate capture time when the contrast of the initialization signal lies above the value;
   detecting NIR light reflected from the iris during the authenticate capture time;
   generating a NIR signal in response to NIR light reflected from the iris during the authenticate capture time;
   generating a NIR image from the NIR signal; and
   determining an authentication status based on the NIR image.

10. The method according to claim 9, further wherein the value is a threshold contrast level.

11. The method according to claim 8, further comprising illuminating the iris with both NIR light and visible light at a same time during an initial capture time.

12. The method according to claim 8, wherein the authentication status is determined by a match of the iris image with a previously registered image stored in an iris database.

13. The method according to claim 11, wherein the initialization image is an initial NIR image, the initialization signal is an initial NIR signal output in response to NIR light reflected from the iris and detected during the initial capture time, and the contrast of the initialization image is the contrast of the initial NIR image.

14. The method according to claim 13, and further comprising:
   generating an initial visible image from an initial visible signal output in response to visible light reflected from the iris and detected during the initial capture time; and
   determining a contrast of the initial visible image.

15. The method according to claim 14, wherein the value is the contrast of the initial visible image.

16. A mobile apparatus operable for biometric user authentication, the apparatus comprising:
   a first illumination source disposed on a host device that outputs first light;

a second illumination source disposed on the host device that outputs second light, the first and second illumination sources to illuminate an iris with first and second light, respectively, at a same time during an initial capture time;

a camera disposed on the host device, comprising:
- a first imaging sensor to receive first light reflected from the iris during the initial capture time, and generate a first electrical signal that represents the received first light reflected from the iris during the initial capture time;
- a second imaging sensor to receive second light reflected from the iris during the initial capture time, and generate a second electrical signal that represents the received second light reflected from the iris during the initial capture time; and
- a processor coupled to the first and second imaging sensors, the processor to:
  - generate first and second images in response to the first and second electrical signals, respectively;
  - determine which image between the first and second images has a highest contrast;
  - select a first illumination wavelength to be a selected illumination wavelength when the first image has the highest contrast, and a second illumination wavelength to be the selected illumination wavelength when the second image has the highest contrast;
  - activate one of the first illumination source and the second illumination source to illuminate the iris at the selected illumination wavelength during an authenticate capture time;
  - activate one of the first imaging sensor and the second imaging sensor to receive reflected illumination from the iris at the selected illumination wavelength during the authenticate capture time, and generate a selected electrical signal that represents the reflected illumination from the iris at the selected illumination wavelength;
  - generate an image of the iris of the person in response to the selected electrical signal; and
  - determine an authentication status of the person based on the image of the iris.

17. The apparatus according to claim 16, wherein the first light is near infrared (NIR) light.

18. The apparatus according to claim 17, wherein the second light is visible light.

19. The apparatus according to claim 18, wherein the first and second images are NIR and visible images, respectively, the first and second imaging sensors are NIR and visible sensors, respectively, and the first and second electrical signals are NIR and visible electrical signals, respectively.

20. The apparatus according to claim 16, wherein the first and second illumination wavelengths are a NIR wavelength and a visible wavelength, respectively.

* * * * *